United States Patent
Kreitzer

[11] 4,182,549
[45] Jan. 8, 1980

[54] COMPACT WIDE ANGLE LENS

[75] Inventor: Melvyn H. Kreitzer, Santa Monica, Calif.

[73] Assignee: Vivitar Corporation, Santa Monica, Calif.

[21] Appl. No.: 941,522

[22] Filed: Sep. 11, 1978

[51] Int. Cl.² .............................................. G02B 9/62
[52] U.S. Cl. .................................................. 350/215
[58] Field of Search ......................................... 350/215

[56] References Cited
U.S. PATENT DOCUMENTS 3,963,325   6/1976   Takahashi .................... 350/215

*Primary Examiner*—Paul A. Sacher
*Attorney, Agent, or Firm*—John E. Peele, Jr.

[57] ABSTRACT

Disclosed is a very compact, medium wide angle lens of the inverted telephoto type, capable of covering total field angles of up to 63°; comprising six elements including a singlet front group of strong negative power and having extremely good aberrational correction.

2 Claims, 4 Drawing Figures

TANGENTIAL SAGITTAL

COMPACT WIDE ANGLE LENS

The present invention relates to an improved optical system resulting in an unusually compact, wide angle objective of the inverted telephoto type for use with interchangeable lens cameras requiring a long back focus. Particularly, the objective lens has strong negative power at the front and strong positive power at the rear, yet is well corrected without the use of an excessive number of elements or of expensive high-index glasses.

Wide angle lenses for use with interchangeable lens cameras, such as cameras of the 35 mm format, have been improved as to size, bulk, weight and optical characteristics as well as relative cost over the last few years. However, further improvements are desired, particularly as to compactness and relative cost while maintaining and improving the degree of optical correction. For use on interchangeable lens cameras, requirements such as long back focus, are present in the design of such lenses which design needs are opposite to the desired results of compactness and a high degree of correction.

In the present embodiment, wide angle lens having the preferred compactness and degree of optical correction, as well as long back focus overcomes many of the shortcomings of the known lenses. In a lens of the inverted telephoto type, a strong negative power is used at the front of the lens followed by a strong positive power at the rear thereof. Generally, these strong powers together with the highly asymmetric form of the lens make difficult certain aberrational corrections. However, an improved exceedingly compact, and well corrected wide angle lens of moderate cost is provided according to the present invention. This six element lens is capable of covering field angles of up to 63° at an effective aperture of f/2.8.

An object of the present invention is to provide a compact, well corrected wide angle lens having a long back focus, which lens is of a form having a strong negative power front group and a strong negative power rear group.

Other objects and advantages of the invention will become apparent from the detailed description which follows, when taken in conjunction with the accompanying drawings in which.

Figure 1:
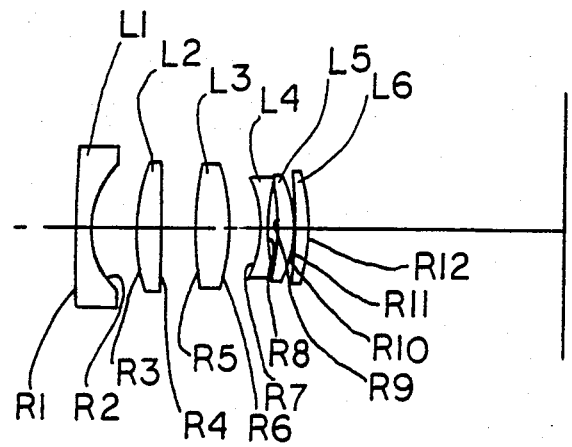
FIG. 1 is a diagrammatic sectional view of an optical system embodying the present invention.

Referring to the drawings, a wide angle lens of the inverted telephoto type having a relatively long back focus for use in interchangeable lens cameras is shown. The lens is designed to be compact, yet to have optimum balance of distortion and aberrations. To achieve the long back focus while keeping the lens as compact as possible, the front of the lens is provided with a strong negative power while the rear of the lens is provided with a strong positive power. Although these strong powers, together with the highly asymmetric form of the lens, make the correction of coma, lateral color and distortion particularly troublesome, extremely good correction of aberrations has been achieved without the use of an excessive number of elements or of expensive high-index glass.

Shown in FIG. 1 is an embodiment of an optical system forming a six element objective lens capable of covering a total field angle up to 63° at an effective aperture of f/2.8. The first element of the lens from the ray entrance side is a negative element L1. This front element is followed by an air spaced positive bi-convex element L2. A third element L3, spaced from element L2, is a bi-convex element of positive power. A fourth element L4, of negative power and bi-concave configuration, is air spaced from the third element L3. This fourth element L4 is followed by two positive meniscus elements L5 and L6.

The above preferred embodiment of a six element, wide angle lens design is described further in the following table, which sets forth data as to the dimensions, parameters, and optical materials of the optical system.

TABLE I

| Surface No. | Radii | Thickness | N | V |
|---|---|---|---|---|
| 1 | 171.000 | 2.50 | 1.607 | 56.7 |
| 2 | 13.603 | 7.22 | | |
| 3 | 26.710 | 4.00 | 1.720 | 50.3 |
| 4 | −246.680 | 5.32 | | |
| 5 | 44.448 | 5.50 | 1.618 | 55.2 |
| 6 | −26.718 | 4.78 | | |
| 7 | −17.288 | 1.50 | 1.785 | 26.1 |
| 8 | 51.100 | 1.31 | | |
| 9 | −35.100 | 2.46 | 1.720 | 50.3 |
| 10 | −16.708 | 0.2 | | |
| 11 | −81.42 | 2.20 | 1.762 | 40.3 |
| 12 | −27.96 | | | |

In the above table, the first column lists the surfaces of the lens elements numerically starting at the ray entrance side of the system. The second column lists the radii for the respective surfaces of the elements with the positive values of the radii indicating surfaces which are convex to the ray entrance and the negative values (−) of the radii indicating surfaces which are concave. The third column lists the thickness of the element and the spacing therebetween. The fourth and fifth columns lists respectively the refractive index $N_D$ and the dispersive index $V_D$ of the element.

Figure 2A:
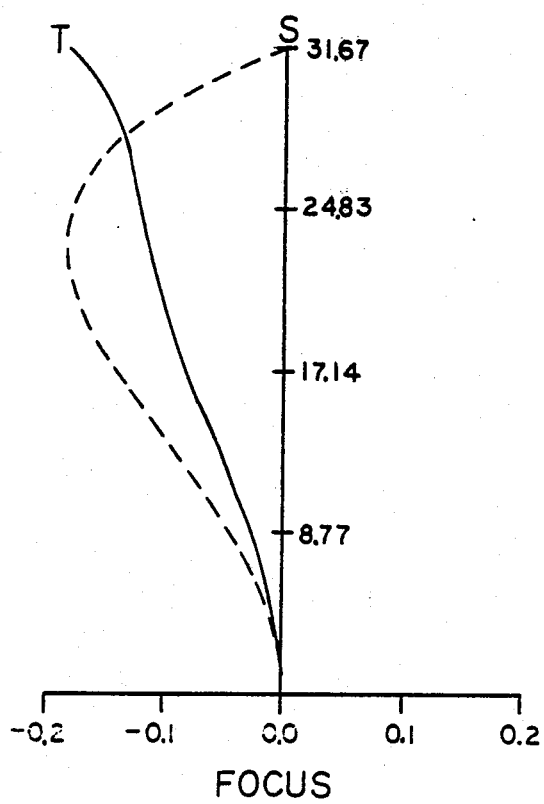
FIG. 2A is a graphical representation of the astigmatic field curves of the lens system shown in FIG. 1 and having the design data given in Table I.

FIG. 2A represents astigmatic field curves for transverse tangential (T) and sagittal (S) field curvature, respectively as shown in solid and dotted lines.

Figure 2B:
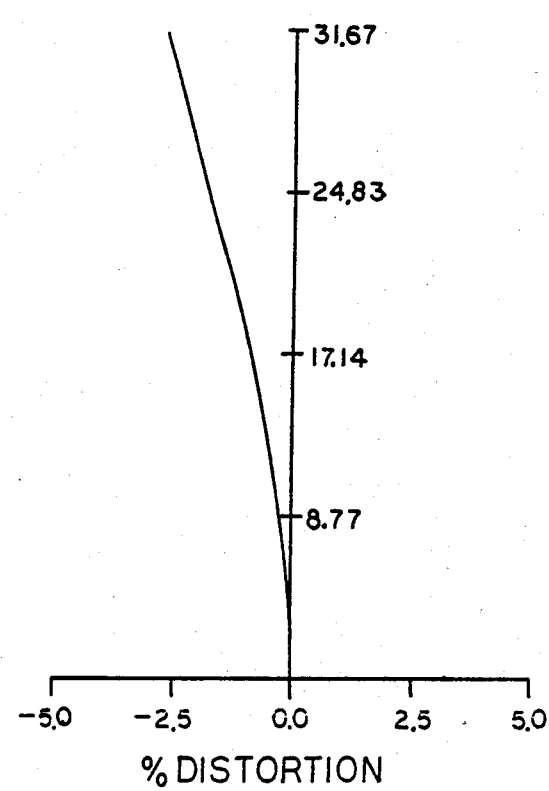
FIG. 2B is a graphical representation of the distortion of the lens plotted as a percentage deviation from a "perfect" image.

FIG. 2B represents the distortion plotted as a percentage deviation from a "perfect" image.

Figure 3:
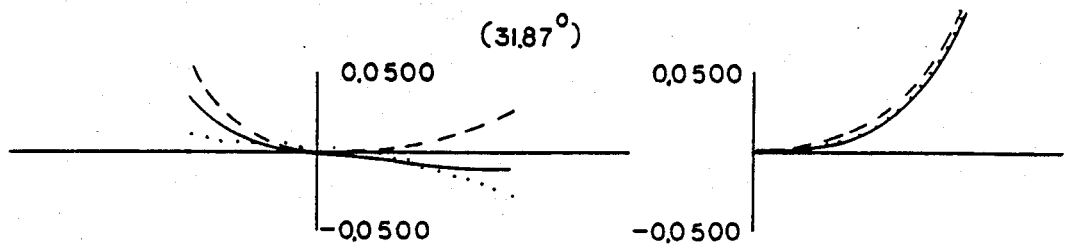
FIG. 3 is a series of graphical representations of various aberrations of the lens system of FIG. 1.
Figure 3:
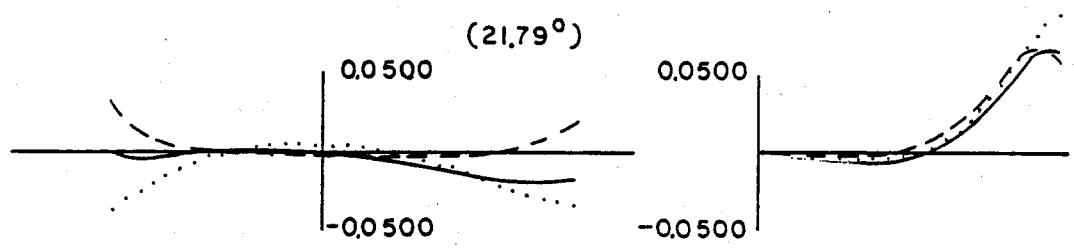
Figure 3:
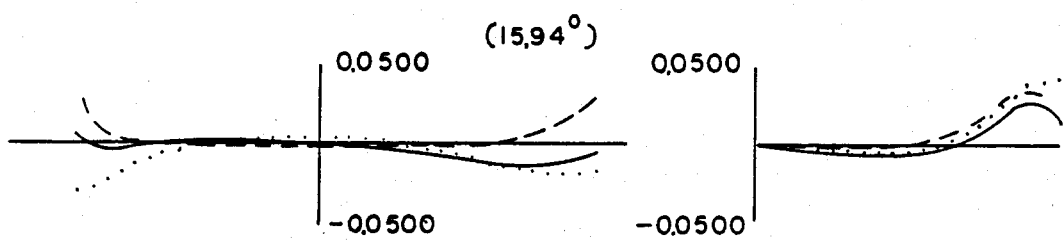
Figure 3:
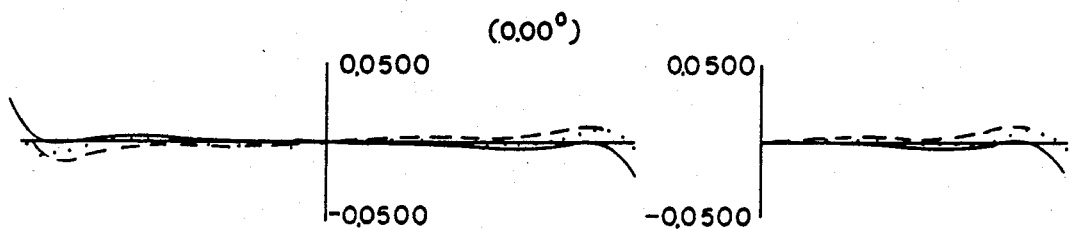

FIG. 3 graphically represents various transverse ray aberrations of the optical system shown in FIG. 1 and having the design data set forth in Table I above. The dashed line curve represents the axial ray bundle for 480.0 nm wave length; the solid line is for 546.1 nm wave length; and the dotted line is for 643.8 nm wave length.

Another embodiment of an optical system according to this invention is exemplified through the following table, setting forth the same data as Table I.

TABLE II

| Surface No. | Radii | Thickness | N | V |
|---|---|---|---|---|
| 1 | 199.566 | 2.50 | 1.607 | 56.7 |
| 2 | 13.720 | 6.46 | | |

TABLE II-continued

| Surface No. | Radii | Thickness | N | V |
|---|---|---|---|---|
| 3 | 29.451 | 4.50 | 1.773 | 49.6 |
| 4 | −427.934 | 5.09 | | |
| 5 | 39.406 | 6.00 | 1.618 | 55.2 |
| 6 | −26.522 | 4.83 | | |
| 7 | −18.724 | 1.50 | 1.785 | 26.1 |
| 8 | 48.112 | 1.40 | | |
| 9 | −31.327 | 2.39 | 1.773 | 49.6 |
| 10 | −16.526 | 0.20 | | |
| 11 | −129.256 | 2.13 | 1.762 | 40.3 |
| 12 | −33.339 | | | |

While preferred embodiments of the present invention have been described and illustrated, it is apparent alterations, additions, and omissions may be made without departing from the scope of the invention.

I claim:

1. A compact wide angle lens having a strong negative power front section and strong positive power rear section, according to substantially the following specification:

| Surface No. | Radii | Thickness | N | V |
|---|---|---|---|---|
| 1 | 171.000 | 2.50 | 1.607 | 56.7 |
| 2 | 13.603 | 7.22 | | |
| 3 | 26.710 | 4.00 | 1.720 | 50.3 |
| 4 | −246.680 | 5.32 | | |
| 5 | 44.448 | 5.50 | 1.618 | 55.2 |
| 6 | −26.718 | 4.78 | | |
| 7 | −17.288 | 1.50 | 1.785 | 26.1 |
| 8 | 51.100 | 1.31 | | |
| 9 | −35.100 | 2.46 | 1.720 | 50.3 |
| 10 | −16.708 | 0.2 | | |
| 11 | −81.42 | 2.20 | 1.762 | 40.3 |

-continued

| Surface No. | Radii | Thickness | N | V |
|---|---|---|---|---|
| 12 | −27.96 | | | | wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction N and the dispersive index V of the optical materials of the respective elements.

2. A compact wide angle lens having a strong negative power front section and strong positive power rear section, according to substantially the following specification:

| Surface No. | Radii | Thickness | N | V |
|---|---|---|---|---|
| 1 | 199.566 | 2.50 | 1.607 | 56.7 |
| 2 | 13.720 | 6.46 | | |
| 3 | 29.451 | 4.50 | 1.773 | 49.6 |
| 4 | −427.934 | 5.09 | | |
| 5 | 39.406 | 6.00 | 1.618 | 55.2 |
| 6 | −26.522 | 4.83 | | |
| 7 | −18.724 | 1.50 | 1.785 | 26.1 |
| 8 | 48.112 | 1.40 | | |
| 9 | −31.327 | 2.39 | 1.773 | 49.6 |
| 10 | −16.526 | 0.20 | | |
| 11 | −129.256 | 2.13 | 1.762 | 40.3 |
| 12 | −33.339 | | | | wherein the first column lists the surfaces of the lens elements numerically starting at the ray entrance side of the system; the second column lists the respective base radii; the third column lists the thicknesses of the respective elements and the spacing therebetween; the fourth and fifth columns respectively list the index of refraction N and the dispersive index V of the optical materials of the respective elements.

* * * * *